United States Patent
Ehrlich (10) Patent No.: US 11,420,777 B1
(45) Date of Patent: Aug. 23, 2022

(54) SPHERICAL MOBILITY SYSTEM

(71) Applicant: Lockheed Martin Corporation, Bethesda, MD (US)

(72) Inventor: Joshua William Ehrlich, Denver, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 476 days.

(21) Appl. No.: 16/746,699

(22) Filed: Jan. 17, 2020

Related U.S. Application Data (60) Provisional application No. 62/806,685, filed on Feb. 15, 2019.

(51) Int. Cl.
*B64G 4/00* (2006.01)
*B64G 1/52* (2006.01)
(Continued)

(52) U.S. Cl.
CPC .............. *B64G 4/00* (2013.01); *B60K 17/00* (2013.01); *B60L 15/20* (2013.01); *B60L 50/60* (2019.02);
(Continued)

(58) Field of Classification Search
CPC . B64G 4/00; B64G 1/421; B64G 1/52; B64G 1/66; B64G 2700/00; B60K 17/00; B60L 15/20; B60L 50/60; B60L 2200/00
See application file for complete search history.

(56) References Cited

U.S. PATENT DOCUMENTS

| | | | | |
|---|---|---|---|---|
| 5,064,151 A | * | 11/1991 | Cerimele | B64G 1/62 |
| | | | | 244/172.1 |
| 6,188,874 B1 | * | 2/2001 | Cronauer | B64G 1/66 |
| | | | | 244/158.6 |

(Continued)

FOREIGN PATENT DOCUMENTS

| CN | 105358085 A | * | 2/2016 | ........... A61B 17/142 |
|---|---|---|---|---|
| CN | 105992993 A | * | 10/2016 | ............... G05G 5/03 |

(Continued)

OTHER PUBLICATIONS

IEEE Conference Paper 2015 40th International Conference on Infrared, Millimeter, and Terahertz waves (IRMMW-THz) (pp. 22-101) Digital Object Identifier: 10.1109/IRMMW-THz.2015.732738 (Year: 2015).*

(Continued)

*Primary Examiner* — Behrang Badii
*Assistant Examiner* — Jalal C Coduroglu
(74) *Attorney, Agent, or Firm* — BakerHostetler (57) ABSTRACT

A rover can include a spherical shall and an avionics hub. The spherical shell defines a spherical volume and having an inner surface and an outer surface. The avionics hub is disposed within the spherical volume. The avionics hub includes an avionics shell, a data acquisition unit, and a plurality of motortrain assemblies. The avionics shell is disposed with the spherical volume of the spherical shell. The data acquisition unit is disposed within the avionics shell. Each motortrain assembly includes a motorized wheel extending at least partially through the avionics shell and in contact with the inner surface of the spherical shell, the plurality of motortrain assemblies configured to rotate the spherical shell relative to the avionics shell to move the rover.

20 Claims, 6 Drawing Sheets

(51) Int. Cl.
  *B64G 1/66* (2006.01)
  *B64G 1/42* (2006.01)
  *B60L 15/20* (2006.01)
  *B60L 50/60* (2019.01)
  *B60K 17/00* (2006.01)

(52) U.S. Cl.
  CPC .............. *B64G 1/421* (2013.01); *B64G 1/52* (2013.01); *B64G 1/66* (2013.01); *B60L 2200/00* (2013.01); *B64G 2700/00* (2013.01)

(56) References Cited

U.S. PATENT DOCUMENTS

| | | | |
|---|---|---|---|
| 9,395,123 B1* | 7/2016 | Leimkuehler | F28D 15/00 |
| 2011/0043515 A1* | 2/2011 | Stathis | G01C 15/002 |
| | | | 434/118 |
| 2016/0264266 A1* | 9/2016 | Stone | B64G 1/222 |
| 2017/0036782 A1* | 2/2017 | Dula | B64G 1/402 |
| 2017/0036783 A1* | 2/2017 | Snyder | B33Y 70/00 |
| 2017/0337813 A1* | 11/2017 | Taylor | G05D 1/0285 |
| 2018/0043838 A1* | 2/2018 | Ellerman | A63H 33/26 |
| 2018/0043952 A1* | 2/2018 | Ellerman | B60K 1/00 |
| 2019/0315497 A1* | 10/2019 | Blomquist | B64G 1/222 |
| 2022/0187847 A1* | 6/2022 | Celia | G06N 20/00 |

FOREIGN PATENT DOCUMENTS

| | | | | |
|---|---|---|---|---|
| EP | 1953932 A1 * | 8/2008 | | G02B 7/007 |
| JP | H10505560 A * | 8/1995 | | |
| WO | WO-0071981 A1 * | 11/2000 | | G01H 9/004 |
| WO | WO-2013060693 A2 * | 5/2013 | | B63G 8/001 |
| WO | WO-2017218696 A1 * | 12/2017 | | B64G 1/222 |

OTHER PUBLICATIONS

IEEE Conference Paper 2015 40th International Conference on Infrared, Millimeter, and Terahertz waves (IRMMW-THz) (pp. 1-153) ISBN (Electronic): 978-1-4799-8272-1; ISBN (USB): 978-1-4799-8271-4; ISSN (Electronic): 2162-2035 (Year: 2015).*

IEEE Conference Paper ISBN (Paper): 978-1-4244-6431-9; ISBN (Online): 978-84-7653-472-4 Proceedings of the Fourth European Conference on Antennas and Propagation (pp. 1-141) (Year: 2010).*

* cited by examiner

SPHERICAL MOBILITY SYSTEM

CROSS-REFERENCES TO RELATED APPLICATIONS

This applications claims the benefit of U.S. Provisional Application No. 62/806,685, filed on Feb. 15, 2019, which is incorporated herein by reference in its entirety.

STATEMENT REGARDING FEDERALLY SPONSORED RESEARCH OR DEVELOPMENT

Not applicable.

BACKGROUND

Field

The present description relates in general to space exploration vehicles, and more particularly to, a lunar exploration rover capable of accurately pinpointing the presence of subsurface ice and of traversing across variable terrains in extraterrestrial environments.

Description of the Related Art

The description provided in the background section should not be assumed to be prior art merely because it is mentioned in or associated with the background section. The background section may include information that describes one or more aspects of the subject technology.

Robotic missions to the moon date back to the early 1960s. Designed to survey the lunar regolith on and below the surface, orbiting lunar spacecraft have succeeded at finding traces of water within the soil, however spacecraft traveling to the surface have been fixed to their locations due to their inability to move across the surface.

Because of these limitations, traces of water on the moon have been generalized as vast stretches of the lunar landscape has not successfully been accessed or surveyed. Lunar surface spacecraft have been deployed to just a handful of locations for a limited duration of no more than just a couple of weeks, at most. Similarly, remote spacecraft (e.g. Chandryannl) and impactor spacecraft (e.g. LCROSS) have also been successful in defining locations of ice within the lunar soil, but this data is limited to the general area where the telemetry was collected.

Other rovers may be capable of traversing across the lunar surface but have limited drivetrain and power supply capabilities that only allow the rovers to travel from several meters to just a few kilometers in a single region. Similarly, impactor spacecraft have only been capable of analyzing the ejecta plume created by the spacecraft's crash location. The data collected from those impacts, similar to past lunar surface spacecraft, have been limited to a generalized area.

Space agencies, such as NASA, have identified that deep space travel will require significant resources, costly launch vehicle construction, and significant cost for payload delivery. For example, NASA may require cost saving opportunities (i.e. space-based resources) to achieve future deep space objectives. Advantageously, use of space resources, such as lunar water or ice radically lowers beyond lower Earth orbit costs. Approximately 30 billion megatons of ice deposits were discovered at the Moon's poles. Therefore, prospecting for the purpose of In-Situ Resource Utilization can allow for deep space travel of a significantly lower cost.

Previous efforts to provide prospecting spacecrafts for landing on the moon to conduct extensive mapping of water in the lunar soil, were cancelled before launch. For example, in 2017, NASA's first lunar prospecting rover (Resource Prospector) was cancelled due to mission overcomplexity. Currently, lunar exploration is limited to remote scanning of the lunar poles or the permanently shadowed regions (PSRs). Current vessels which perform this remote scanning include CubeSats (Lunar Flashlight, Lunar IceCube), and are only capable of doing so for a limited amount of time and range.

It would be advantageous to have a space exploration vehicle or rover capable of accurately pinpointing the presence of subsurface ice across various lunar terrains, confirming the previously explored locations, and/or traveling to new points of interest, promoting In-Situ Resource Utilization.

SUMMARY

The subject technology is illustrated, for example, according to various aspects described below.

According to some embodiments, a rover can include: a spherical shell defining a spherical volume and having an inner surface and an outer surface; an avionics hub disposed within the spherical volume, the avionics hub including: an avionics shell disposed with the spherical volume of the spherical shell; a data acquisition unit disposed within the avionics shell; and a plurality of motortrain assemblies, wherein each motortrain assembly includes a motorized wheel extending at least partially through the avionics shell and in contact with the inner surface of the spherical shell, the plurality of motortrain assemblies configured to rotate the spherical shell relative to the avionics shell to move the rover.

The spherical shell can be formed as a continuous shell. The spherical shell can include a hybrid material. The spherical shell can include a plurality of treads extending from the outer surface of the spherical shell. The plurality of treads each can have a polygonal profile. Each of the plurality of treads can define a tread cavity on the outer surface.

According to some embodiments, the avionics hub further includes a platform and at least one motortrain assembly of the plurality of motortrain assemblies is coupled to the platform. The platform can include self-leveling relative to the spherical shell. At least one motortrain assembly can include a motortrain base coupling the at least one motortrain assembly to the platform.

According to some embodiments, the rover can include a ground penetrating radar operatively coupled to the data acquisition unit. The rover can include a neutron spectrometer operatively coupled to the data acquisition unit. The rover can include a motor control unit operatively coupled to at the plurality of motortrain assemblies, wherein the motor control unit controls rotation of the motorized wheel of each of the plurality of motortrain assemblies. The rover can include a vehicle management system operatively coupled to the motor control unit.

According to some embodiments, the avionics hub can include a power system operatively coupled to the plurality of motortrain assemblies. The power system can include a battery. The power system can include a power data unit.

According to some embodiments a method to locate resources within an environment can include rotating a spherical shell of a rover via a plurality of motortrain assemblies disposed within the spherical shell to move the rover within the environment; and identifying resources in the environment near a position of the rover via an avionics hub disposed within the spherical shell of the rover.

The method can further include self-leveling a platform of the avionics hub during the rotation of the spherical shell. The method can further include transmitting and receiving ground penetrating radar from the avionics hub into the environment. The method can further include controlling rotation at a motorized wheel of each of the plurality of motortrain assemblies to control a movement direction and speed of the rover.

In the following description, specific embodiments are described to shown by way of illustration how the invention may be practiced. It is to be understood that other embodiments may be utilized and changes may be made without departing from the scope of the present invention.

DETAILED DESCRIPTION

Exploring lunar terrain for prospecting or other purposes can require a rover to encounter difficult terrain, limiting the range or usefulness of the rover. Rovers for exploring lunar terrain can further require the rover to traverse terrain for extended distances and durations to provide useful information.

The present disclosure describes a rover that can traverse difficult terrain for extended distances and durations. Embodiments of the present disclosure provide solutions that create more robust rovers while minimizing complexity. Embodiments described herein increase the range and effectiveness of the rover.

Figure 1:
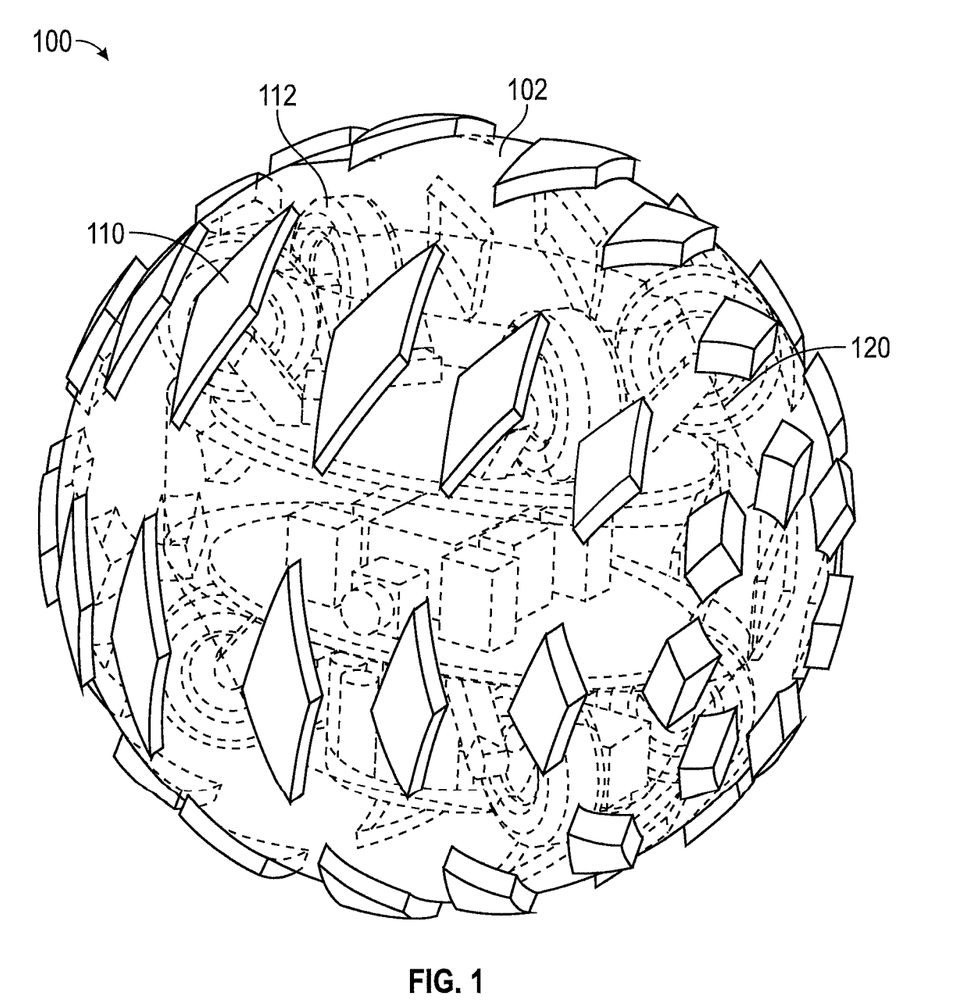
FIG. 1 illustrates perspective view of a rover, according to some embodiments of the present disclosure.
Figure 2:
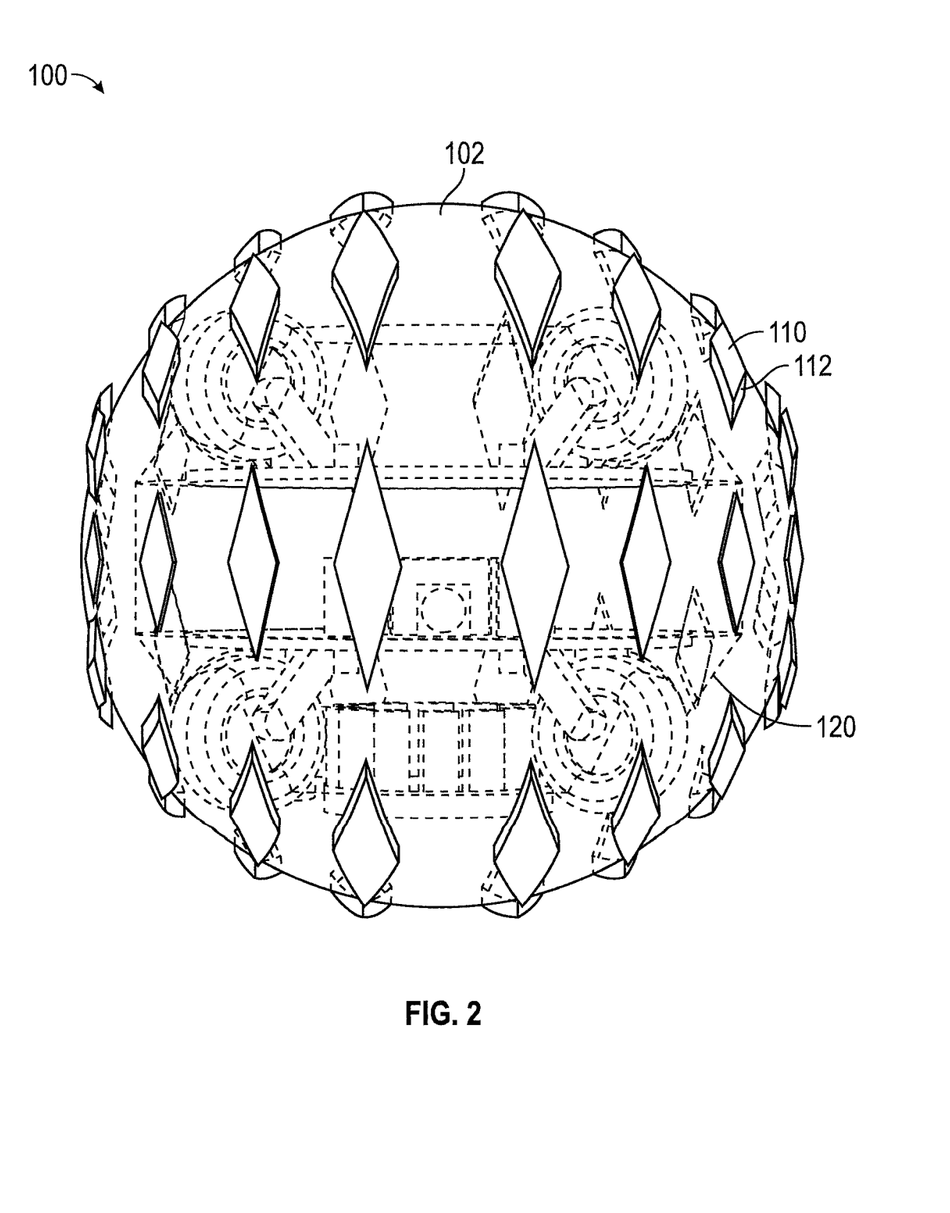
FIG. 2 illustrates a front elevation view of the rover of FIG. 1, according to some embodiments of the present disclosure.
Figure 3:
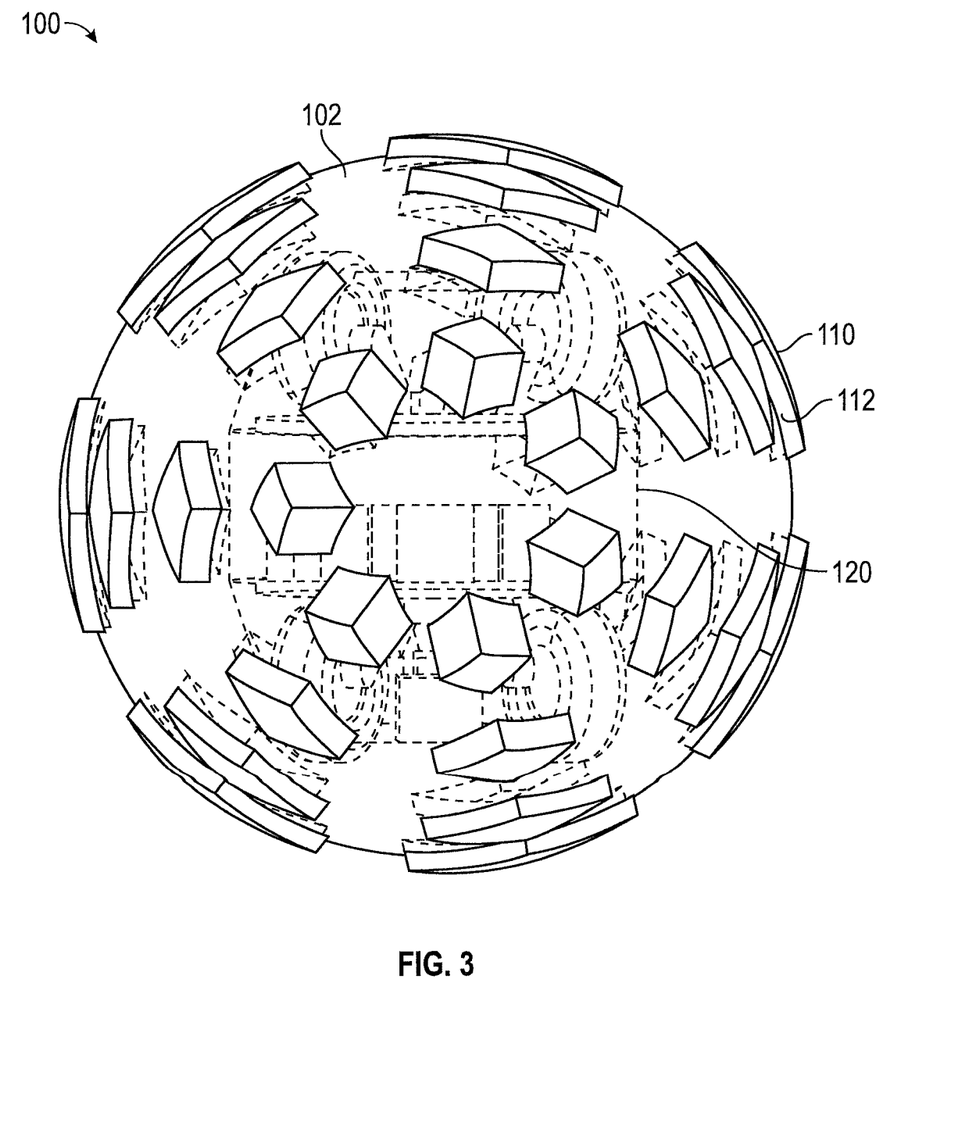
FIG. 3 illustrates a side elevation view of the rover of FIG. 1, according to some embodiments of the present disclosure.

According to some embodiments, a rover can be used to explore terrain, such as lunar terrain. FIG. 1 illustrates perspective view of a rover 100, according to some embodiments of the present disclosure. FIG. 2 illustrates a front elevation view of the rover 100 of FIG. 1, according to some embodiments of the present disclosure. FIG. 3 illustrates a side elevation view of the rover 100 of FIG. 1, according to some embodiments of the present disclosure. With reference to FIGS. 1-3, the rover 100 is an apparatus for traversing across variable terrains in extraterrestrial environments.

In the depicted example, the rover 100 includes a shell 102 to allow the rover 100 to act as a wheel to roll across terrain. As illustrated, the shell 102 can have a generally spherical shape. The shell 102 can be a hollow volume containing the avionics hub 120 therein.

In some embodiments, the shell 102 can be a modular shell. Optionally, the shell 102 can be a continuous or monolithic structure. Advantageously, the spherical shell design can allow the rover 100 to be lightweight and to travel in a fast and efficient manner to optimize exploration across various lunar soil conditions and terrain. Further, the spherical shell design can provide effective autonomous maneuverability, allowing for exploration and scientific analysis to be achieved in more sought-after sites (craters, lava tubes, PSRs, etc.) without any risk of becoming immobile in the lunar soil or toppling over due to non-homogenous terrain.

Optionally, the shell 102 can include traction-enhancing features, such as treads, extruded ducting, material treatment, or other external features to aid in added mobility and/or traction of the rover 100 on lunar terrains. In some embodiments, the shell 102 can include lava channel grips. As can be appreciated, the features can provide for improved directional changes and potentially digging on the lunar terrain.

As illustrated in FIGS. 1-3, the shell 102 can include skin grousers or treads 110 extending from the exterior surface of the shell 102. The treads 110 can extend a depth 112 from the exterior surface of the shell 102. Optionally, the treads 110 can have a generally polygonal shape or profile. In some embodiments, the treads 110 can have any suitable shape to enhance traction of the rover 100. The treads 110 can be arranged in a uni-track arrangement and/or a multi-track arrangement. In some embodiments, the treads 110 can be arranged along the outer mold line of the shell 102.

In some embodiments, the shell 102 and the features of the shell 102, such as the treads 110, can be formed from additive manufacturing techniques, such as 3D-printing techniques. In some embodiments, additive manufacturing of the rover 100 can be achieved in-space onboard a spacecraft or an orbital outpost. Structural components, mechanisms, and motors can be developed with 3-D printers either tele-remotely or with humans-in-the-loop. Advantageously, the rover 100 can be modified to adapt to various environments in deep space and to expand its life cycle to accommodate longer mission timelines where accessibility to new technologies or delivery of hardware may be difficult to accommodate.

The shell 102 can be formed from thermoplastics, including, but not limited to polyetherimide (ULTEM), polycarbonate, and/or a hybrid mix thereof. In some embodiments, the shell 102 or other structural components can be formed from a carbon composite. In some embodiments, the shell 102 is formed with a textured surface.

In some applications, the shell 102 can be temporarily encapsulated within a hardened capsule surrounded by a protective airbag system to protect the rover 100 during landing on the lunar surface. Following touchdown, the airbags can deflate and the hardened capsule will open, revealing the rover 100 within. Once fully exposed, the rover 100 can roll out of the capsule and onto the lunar surface to survey the lunar regolith for locations of ice on/within the moon.

Figure 4:
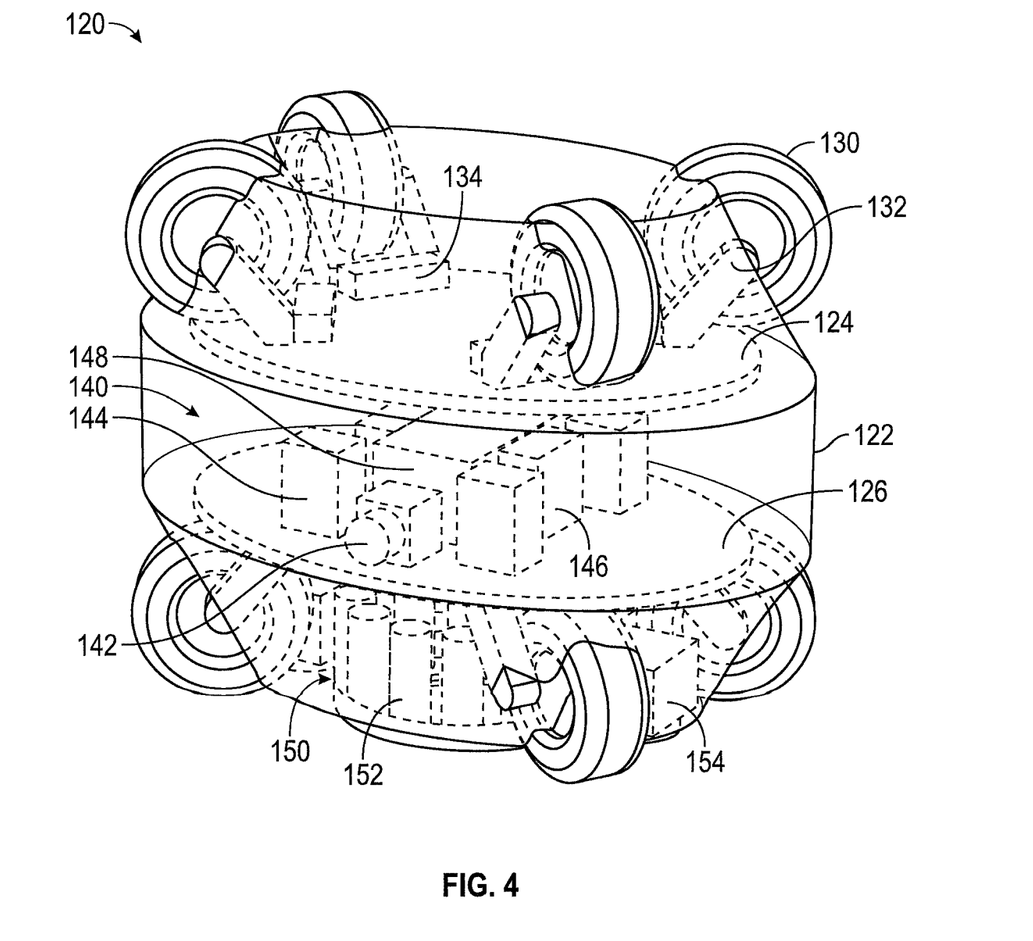
FIG. 4 illustrates a perspective view of an avionics hub for use with the rover of FIG. 1, according to some embodiments of the present disclosure.
Figure 5:
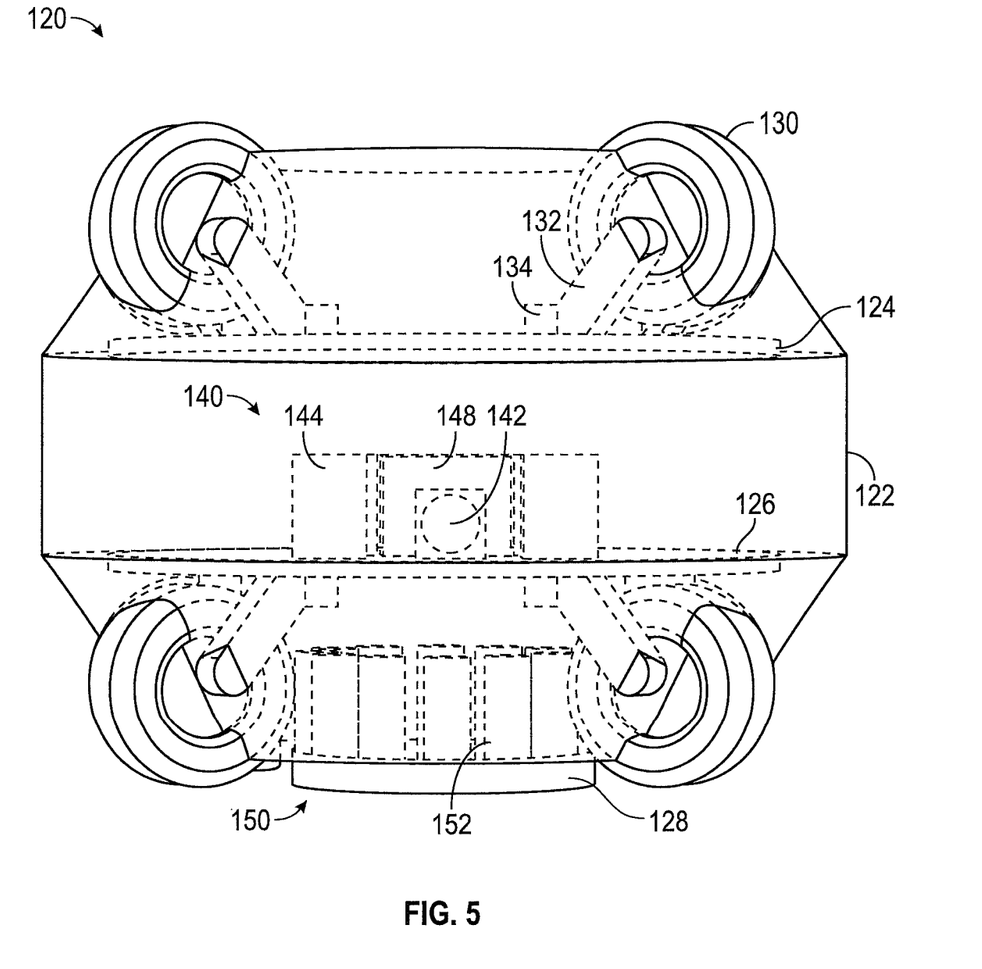
FIG. 5 illustrates a side elevation view of the avionics hub of FIG. 4, according to some embodiments of the present disclosure.

FIG. 4 illustrates a perspective view of an avionics hub 120 for use with the rover 100 of FIG. 1, according to some embodiments of the present disclosure. FIG. 5 illustrates a side elevation view of the avionics hub 120 of FIG. 4, according to some embodiments of the present disclosure. In the depicted example, the avionics hub 120 contains and protects the avionics that allow the rover 100 to move and gather data from the environment.

As illustrated, the avionics can be disposed within an avionics shell 122. The avionics shell 122 can have a similar material construction as the exterior shell 102 of the rover 100. The avionics shell 122 can be protected from the environment by being disposed within the spherical volume of the exterior shell 102. The shell 102 can rotate independently around or otherwise relative to the avionics shell 122.

In some embodiments, the avionics can be secured to one or more platforms 124, 126, 128 within the avionics shell 122. The platforms 124, 126, 128 along with the avionics shell 122 can form the chassis of the rover 100. Optionally, the platforms 124, 126, 128 can be secured to the avionics shell 122. As illustrated the platforms 124, 126, 128 can be vertically spaced apart.

As described herein, the platforms 124, 126, 128 along with the avionics shell 122, can remain generally level to the terrain within the shell 102. Optionally, heavier componentry, such as the batteries 152 and the power data unit 154 of the power system 150 can be disposed on a platform 128 at a lower portion of the avionics shell 122 for a low center of gravity, creating a stable, pendulum-swing alignment, maintaining the lowest point of the avionics hub 120 generally level to the terrain relative to the shell 102 as the rover 100 rotates to move. Advantageously, by allowing the avionics shell 122 to remain level or aligned with the terrain relative to the shell 102, the avionics hub 120 and the avionics therein can remain aligned or level with the terrain allowing the rover 100 to take more a more reliable survey of the environment, including the terrain.

In the depicted example, the avionics hub 120 includes one or more motortrain assemblies 130 to rotate the shell 102 and move the rover 100. During operation the motortrain assemblies 130 rotate the shell 102 relative to the avionics hub 120 in a controlled manner to allow the rover 100 to travel in an intended direction. As illustrated, each motortrain assembly 130 includes a motorized wheel 132 extending from a base 134. The motorized wheel 132 can contact and rotate against an inner surface of the shell 102, imparting a rotational force against the shell 102. In some embodiments, the motorized wheel 132 of the motortrain assembly 130 extends beyond the avionics shell 122. Optionally, the motorized wheel 132 can extend through openings in the avionics shell 122.

As illustrated, the motortrain assemblies 130 can be mounted within the avionics shell 122 on the platforms 124, 126. In some embodiments, the motortrain assemblies 130 are mounted on an upper portion of the upper platform 124 and a lower portion of the lower platform 126. As can be appreciated, the motortrain assemblies 130 can be generally equally spaced apart to provide an even application of rotational force and allow for coordinated movements of the motortrain assemblies 130 to rotate or move the rover 100 as desired. As illustrated, the avionics hub 120 includes four motortrain assemblies 130 mounted on the upper platform 124 and four motortrain assemblies 130 mounted on the lower platform 126. As can be appreciated, the avionics hub 120 can include various configurations of motortrain assemblies 130, including two motortrain assemblies 130, four motortrain assemblies 130, six motortrain assemblies 130, ten motortrain assemblies 130, twelve motortrain assemblies 130, etc., based on desired levels of power and redundancy.

In some embodiments, operation of the motortrain assemblies 130 is controlled by motor control units 148. The motor control units 148 can control the rotational speed, torque, and direction of each of the motortrain assemblies 130. As can be appreciated, the motortrain assemblies 130 can be controlled and operated in a coordinated manner to move the rover 100 along a desired path. Optionally, the motor control units 148 can cooperatively coordinate the operation of the motortrain assemblies 130. For example, a vehicle management system 146 can coordinate the operation of the motor control units 148 and therefore the motortrain assemblies 130 to control the movement of the rover 100.

During operation, the vehicle management system 146, utilizing navigation data and/or terrain conditions can apply torque to various motortrain assemblies 130 to navigate a desired path. In addition to coordinating the operation of the motortrain assemblies 130 for movement, the vehicle management system 146 can allow for slip-control and locking functionality. Further, the vehicle management system 146 can utilize the motortrain assemblies 130 to maintain the avionics hub 120 self-leveled relative to the terrain to allow for reliable surveying of the environment, regardless of a flat or sloped region under investigation.

In the depicted example, the avionics hub 120 includes a sensor package 140 to allow the rover 100 to survey the environment and terrain it traverses. In some embodiments, the sensor package 140 includes a data acquisition unit 142 to receive, record, process, and/or transmit information received from integrated sensors and/or other sensors 144 in the sensor package 140. Information may be transmitted from the avionics hub 120 by a communication antenna integrated within the rover 100. Advantageously, the sensor package 140 can include miniaturized field instruments for mapping precise sub-surface lunar ice locations.

In some embodiments, sensors 144 can include a ground penetrating radar and/or a neutron spectrometer to survey and pinpoint subsurface resource deposits either at the lunar poles or the permanently shadowed regions (PSRs). Optionally, the avionics hub 120 can include a near-infrared camera, a video processing unit, a thermal control unit, etc. Advantageously, due to the low center of gravity of the rover 100, the sensor package 140 can be orientated level to the terrain, improving the tractionability, reliability and usefulness of the surveyed information.

In the depicted example, the rover 100 is powered by the power system 150. The power system 150 includes an array of batteries 152. As can be appreciated, the batteries 152 can power the sensor package 140 and the motortrain assemblies 130. In some embodiments, the batteries 152 are rechargeable batteries. Advantageously, recharging the batteries 152 can extend mission lifetimes, test new battery technology for added power storage capabilities in a space environment, and provide a means for designing fleet-based payloads that can expand the exploration of areas of interest at an extraterrestrial location. The charge and discharge of the batteries 152 can be controlled by a power data unit 154. The power data unit 154 can also provide information regarding the charge rate, discharge rate, state of charge, etc. to the data acquisition unit 142.

As described herein, the batteries 152 and other components of the power system 150 can be disposed at or near the bottom portion of the avionics shell 122 to lower the center of gravity of the rover 100.

Optionally, the batteries 152 can be coupled to an inductive loop, enabling the rover 100 to recharge the batteries 152 by positioning the inductive loop over an inductive "wireless" charging pad. In some applications, solar arrays within the hardened delivery capsule described herein will collect photonic energy during peak solar hours and store it within the capsule's onboard power storage system. When the power system 150 of the rover 100 reaches critical levels, the rover 100 can traverse back to the landing capsule to recharge the batteries 152 via a wireless charging pad installed on the capsule structure. In some embodiments, communications hardware will also be housed within the airbag capsule to provide data uplink/downlink with orbiting assets and ground operators back on Earth. Following completion of battery 152 supply regeneration, the rover 100 can depart the wireless recharging pad and continue to locate subsurface ice on the lunar surface.

In some applications, a fleet of rovers 100 can be deployed in a large region on the moon where each rover 100 can access other hardened capsules (in addition to its parent, or "origin" capsule) to recharge its batteries, communicate with other space systems or ground operators, and deliver data for immediate analysis while the fleet of rovers 100 continues its mission.

Figure 6:
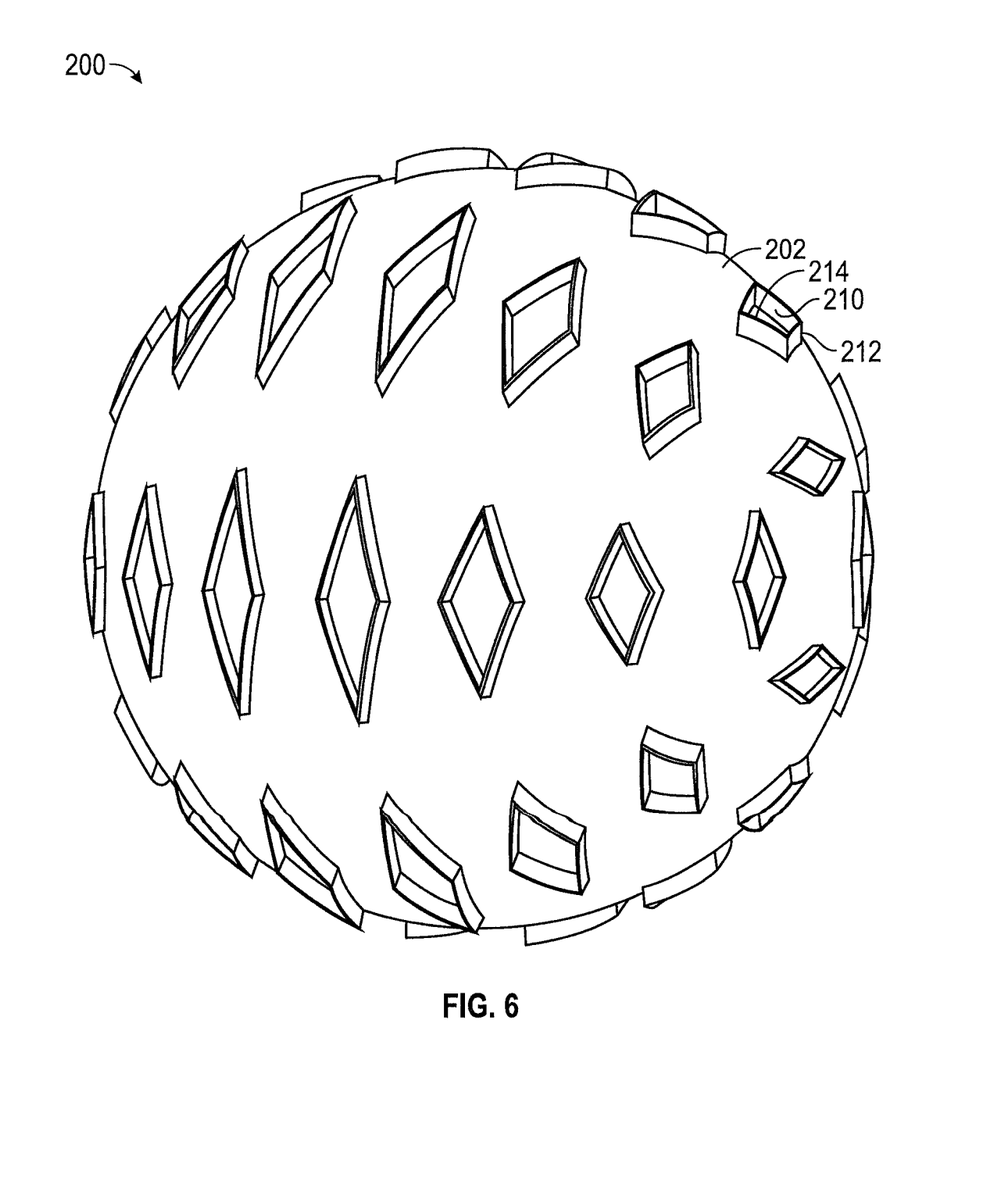
FIG. 6 illustrates perspective view of a rover, according to some embodiments of the present disclosure.

FIG. 6 illustrates perspective view of a rover 200, according to some embodiments of the present disclosure. In the depicted example, the shell 202 can include skin grousers or treads 210 extending from the exterior surface of the shell 202. The treads 210 can define hollow cavities 214 extending a depth 212 from the exterior surface of the shell 202. Optionally, the treads 210 can have a generally polygonal shape or profile. In some embodiments, the treads 210 can have any suitable shape to enhance traction of the rover 200.

As can be appreciated, the rover described herein can be an advanced, low-cost spherical payload (less than 50 kg) designed to travel across an extraterrestrial, dust-ridden environment. The rover described herein can locate ice both on and below the surface of the moon. Lunar ice deposits will generally be located at depths as a little as a few millimeters to hundreds of centimeters below the surface. The rover can be deployed to the surface as a secondary payload from a lunar lander. In some applications the rover can be deployed at the lunar poles, or within permanently shadowed regions (PSRs), individually, or as a fleet. In some applications, based on elevated quantities of hydrogen (possibly water ice) in the PSRs and several areas offering >80% sunlight with less extreme temperature swings, landing locations at the lunar poles can serve as optimal drop zones for prospecting subsurface ice deposits while having access to solar radiation supplies.

In some embodiments, the rover can be primarily autonomous, however in other embodiments the rover can also be capable of being operated manually by either controllers within cislunar space (e.g. astronauts onboard Orion, the Gateway, or a lunar lander) or via relay from the earth. Advantageously, the rovers described herein can be utilized for other areas of interest and terrains in the solar system. These locations of interest may include moons, planets, comets, and asteroids. The rovers described herein may be capable of travelling and functioning on a wide spectrum of terrains ranging from surface ops within lava channels and craters, to subsurface exploration within lava tubes and tunnels.

In accordance with various embodiments, the rovers described herein can provide scientists the unique opportunity to perform field surveillance and analysis of sub-surface ice on some of the most dust-ridden environments in our solar system. Unlike conventional planetary landers and rovers, the rovers described herein possess several enhanced mobility features including structurally-embedded driver motors with added substrate-sensor capability for deciphering terrain density and drivetrain power to traverse across any regolith exterior facing to provide supplemental surface traction over steep and jagged terrain.

As can be appreciated, the rover described herein can provide various potential and benefits which were previously unattainable. For example, the rover described herein provides technology advancements, including autonomous and tele-robotic operations, for conducting low-latent prospecting missions to locate ice deposits on the moon's (sub-)surface. The rover additionally provides the capability to explicitly identify and map (sub-)surface locations of the moon's ice deposits, leading to the evolution of In-Situ Resource Utilization (ISRU) technology designed to mine and process water, rare metals, and other lunar resources. Further advantageously, the rover provides a new, low-cost, cutting-edge prospecting architecture that can be rapidly launched from a launch vehicle on a direct or lunar fly-by mission. Additional benefits are seen in that the rover described herein can have a producible and scalable payload design, applicable to space as well terrestrial applications, including military ops, science, and aid.

Advantageously, the rovers described herein can provide confirmation of sub-surface ice deposits would be the precursor to achieving future demonstrations and long-term missions, such as i) mining missions of lunar regolith and ice; ii) ISRU of the refined water and soil into consumables for lunar lander landing/launch pads, habitats, drinking water, propellant, etc.; and iii) scaled-up resource infrastructure, including pilot plants, to support the production of resources for future applications, orbital propellant depots, supplies for commercial spacecraft, lunar surface infrastructure, and other deep space spacecraft.

As can be appreciated, the rovers described herein could be utilized for prospecting missions to the surface of Mars, near-Earth asteroids, comets, and other celestial bodies.

Terms such as "top," "bottom," "front," "rear", "above", and "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A rover, comprising:
   a spherical shell defining a spherical volume and having an inner surface and an outer surface;
   an avionics hub disposed within the spherical volume, the avionics hub comprising:
   an avionics shell disposed with the spherical volume of the spherical shell;
   a data acquisition unit disposed within the avionics shell; and
   a plurality of motortrain assemblies, wherein each motortrain assembly includes a motorized wheel extending at least partially through the avionics shell and in contact with the inner surface of the spherical shell, the plurality of motortrain assemblies configured to rotate the spherical shell relative to the avionics shell to move the rover.

2. The rover of claim 1, wherein the spherical shell is formed as a continuous shell.

3. The rover of claim 1, wherein the spherical shell comprises a hybrid material.

4. The rover of claim 1, wherein the spherical shell comprises a plurality of treads extending from the outer surface of the spherical shell.

5. The rover of claim 4, wherein the plurality of treads each comprise a polygonal profile.

6. The rover of claim 4, wherein each of the plurality of treads defines a tread cavity on the outer surface.

7. The rover of claim 1, wherein the avionics hub further comprises a platform and at least one motortrain assembly of the plurality of motortrain assemblies is coupled to the platform.

8. The rover of claim 7, wherein the platform is self-leveling relative to the spherical shell.

9. The rover of claim 7, wherein the at least one motortrain assembly comprises a motortrain base coupling the at least one motortrain assembly to the platform.

10. The rover of claim 1, further comprising a ground penetrating radar operatively coupled to the data acquisition unit.

11. The rover of claim 1, further comprising a neutron spectrometer operatively coupled to the data acquisition unit.

12. The rover of claim 1, further comprising a motor control unit operatively coupled to at the plurality of motortrain assemblies, wherein the motor control unit controls rotation of the motorized wheel of each of the plurality of motortrain assemblies.

13. The rover of claim 12, further comprising a vehicle management system operatively coupled to the motor control unit.

14. The rover of claim 1, wherein the avionics hub comprises a power system operatively coupled to the plurality of motortrain assemblies.

15. The rover of claim 14, wherein the power system comprises a battery.

16. The rover of claim 14, wherein the power system comprises a power data unit.

17. A method to locate resources within an environment, the method comprising:
   rotating a spherical shell of a rover via a plurality of motortrain assemblies disposed within the spherical shell to move the rover within the environment; and
   identifying resources in the environment near a position of the rover via an avionics hub disposed within the spherical shell of the rover.

18. The method of claim 17, further comprising self-leveling a platform of the avionics hub during the rotation of the spherical shell.

19. The method of claim 17, further comprising transmitting and receiving ground penetrating radar from the avionics hub into the environment.

20. The method of claim 17, further comprising controlling rotation at a motorized wheel of each of the plurality of motortrain assemblies to control a movement direction of the rover.

* * * * *